Feb. 19, 1963  W. E. MILLIGAN  3,078,012
AUTOMATIC CONTROL DEVICE
Filed Oct. 3, 1960
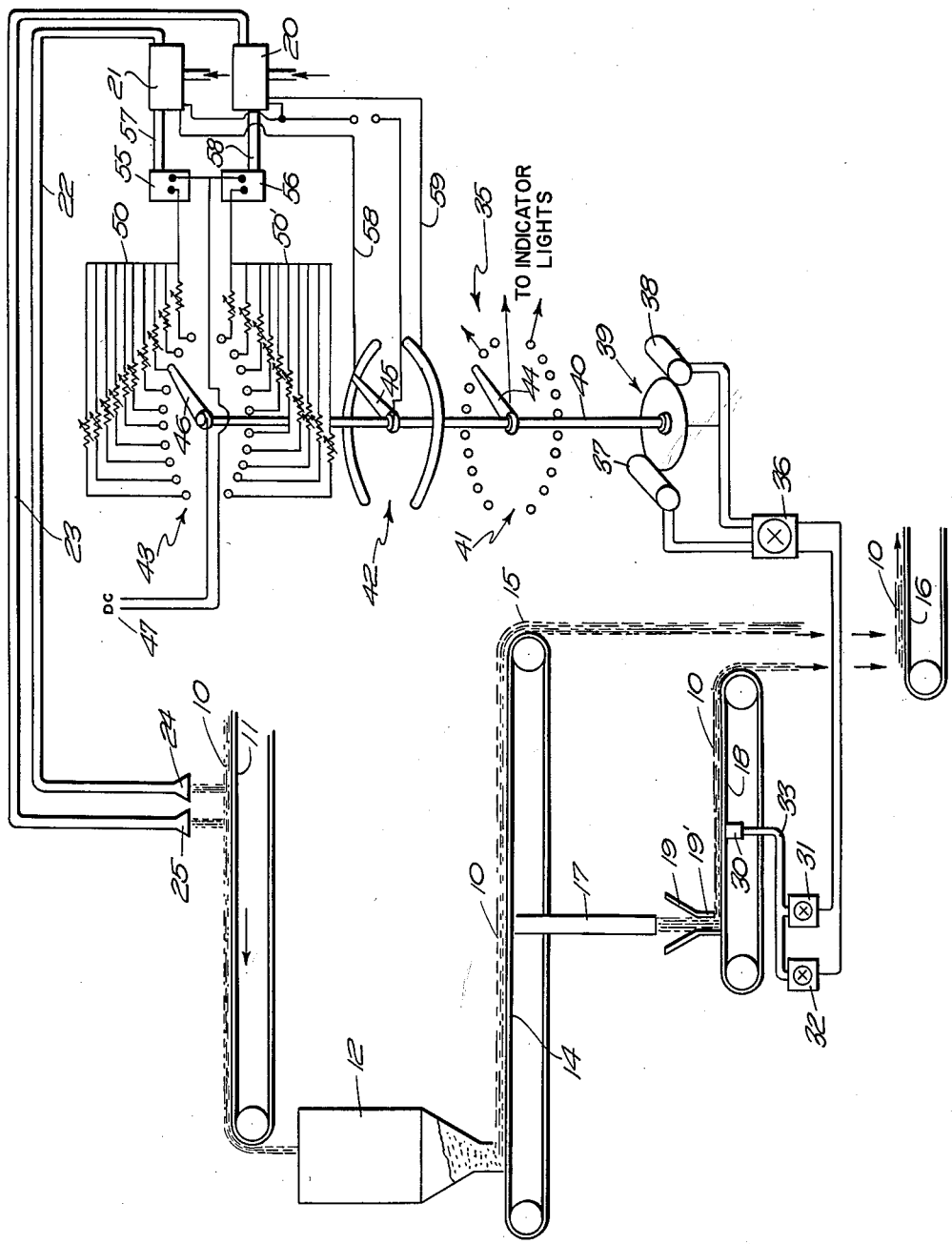
INVENTOR.
WILBUR E. MILLIGAN
BY
*Barlow & Barlow*
ATTORNEYS United States Patent Office 3,078,012
Patented Feb. 19, 1963

3,078,012
AUTOMATIC CONTROL DEVICE
Wilbur E. Milligan, Cranston, R.I., assignor, by mesne assignments, to The New York Air Brake Company
Filed Oct. 3, 1960, Ser. No. 60,118
5 Claims. (Cl. 222—57)

This invention relates to a device and a method whereby two or more liquids may be automatically fed to control the bulk-density, or consistency, or pH of a comminuted, ground, pulverized or other crushed material. The invention relates particularly to a means whereby amounts of liquid may be automatically added in proper amounts to control the density of the crushed or bulk material.

This invention is adapted for many industrial uses such as controlling the bulk density of coal fed to coking ovens, controlling the desired consistency of dough for bread or cake, and adding trimming quantities of acid or alkali to a chemical mixture to maintain a desired value of pH. The embodiment of the invention which is described in detail hereinafter is particularly adapted to be used in such instances to permit two liquids to be carefully and accurately added in a continuous and automatic manner to control the density or other physical or chemical characteristics of the third material.

In accomplishing this result in accordance with one method, the device embodies a continuous bulk conveyor to which the material is fed and to which one or both of the treatment chemicals may be added. This conveyor moves the material to a mixing device or pug mill at a given rate. The feed of the material down this conveyor is therefore on a volumetric basis. After mixing, the material is moved down a second conveyor at a predetermined rate and somewhere along this conveyor, a sample is taken and this sample is fed to a continuous weigher in the form of a belt conveyor to which the material is fed via a hopper with a fixed gate to control the volume of material on the weighing platform. The weight of this material mathematically then is related directly to the actual bulk density. The weight signal therefore being an indication of the bulk density may be fed to responsive devices in the form of switches, one of which may be adjusted to close the contact for any density value higher than a set point while the other may be set to close a contact for density value lower than a set point. Since the switches may be adjustable, they can be set with a band so that the sampler which will continually sample the stream will either close one circuit if the sample exceeds a chosen density or another circuit if the sample is below a chosen density. Also because of this particular arrangement if the sample is within the band, the circuit will remain open. These signals may then be fed to a controller mechanism such as a stepping switch with two solenoids, one of which will step in one direction in response to the closing of one switch and the other of which will step in the other direction in response to the closing of the other switch. Switch contacts may then be arranged to control the amount of materials fed to the initial conveyor belt, and in order to accommodate the time delay between the addition of the chemical and the actual taking of the sample a predetermined time delay device may be inserted in series with the control switches and the stepping switch.

It is an object therefore of this invention to provide an automatic means whereby a material, for instance a solid, may have its bulk density automatically controlled.

Another object of the invention is to provide a device which will automatically sense the density of a material and correctly add the proper chemicals to the material to maintain its density within a chosen band.

A still further object of the invention is to provide an automatic control device which will maintain a certain physical or chemical condition of a material by use of a function generator with an adjustable built-in delay device to account for the delay period between the adding of the chemical controlling the density and the sampling of the material.

With these and other objects in view, the invention consists of certain novel features of construction as will be more fully described and particularly pointed out in the appended claims.

For the purposes of illustration reference will be had to the appended drawings in which the figure is a diagrammatic representation of one arrangement which the apparatus may take in connection with a dry pulverized material whose bulk density is to be controlled.

Referring now to the drawings in the figure finely divided material 10 is continuously advanced by a conveyor belt 11 toward a suitable mixing device or pug mill 12. The material 10 passing on conveyor belt 11 is preferably fed to the mixer 12 at a predetermined volumetric rate so that at all times it is known what volume of material is passing into the pug mill 12. Obviously, of course, this volumetric rate can be interpreted and computed into gravimetric units. In order to modify the bulk density of the material 10, one or more liquid materials are provided for which liquid materials may be fed from suitable storage tanks (not shown) into pumps designated 20 and 21 and then fed along pipe lines 22, 23 to spray nozzles 24, 25 that are close to the material 10 passing over the belt conveyor 11. Under suitable control means which will be presently described, one of these modifying liquids may be sprayed on to the granular material being passed over the conveyor belt 11. Material then which has possibly some modifying liquid added thereto is being discharged into the mixing device of pug mill 12. After mixing has taken place, the material is discharged at a constant rate onto a second conveyor 14 which conveyor basically leads from the pug mill 12 to a discharge point as at 15 where the material may be discharged to a suitable utilization point such as the third conveyor belt 16.

While the material is passing along the conveyor belt 14, a sample is taken of this material which sample passes down a chute 17 to a stream weighing device 18 which is provided with an inlet hopper 19 having a fixed height discharge gate 19'. It will be thus apparent that with a uniform belt speed and the fixed height of a gate 19' that the volume of material on the weighing platform of the conveyor 18 would remain constant. The conveyor 18 may be generally called a short belt gravimetric weigher. This short belt gravimetric weigher has a weighing signal which is generated as at 30 and passes on to a pair of switches 31 and 32. The switches 31 and 32 may be in actuality pressure sensitive switches since a pneumatic pressure may be generated in the weight sensitive device 30 and transmitted via the conduit generally shown as 33 to the switches 31 and 32. One of these switches is adjusted to close a contact for a value higher than a set point while the other switch will be set to close a contact for a weight value lower than a set point. It will be obvious that since both these switches are adjustable, they can be set so that a band may be represented between their set weights which band will represent not only a given gravimetric weight but also will be related to a particular bulk density of the material. For the purpose of the discussion here, we shall assume that the switch 31 is a low sensitive switch while switch 32 is a high sensitive switch. The output of these switches 31 and 32 is fed to an apparatus that can be generally designated a controller and which is generally designated on the drawing as 35.

The controller 35 is designed to follow a family of curves and operates as a function generator. The controller has an adjustable built-in delay to account for the delay period between the time that a modifying liquid is applied to the material 10 and until it is weighed on the gravimetric weigher 18. To accomplish this, a timing device 36 is inserted at the input to the controller. Through the timing device 36 the above weight or below weight signals are fed to the controller 35. In essence the controller 35 is either a stepping switch with two actuating solenoids 37, 38 or a synchronous motor with a permanent magnet rotor and two field windings that will be circuitwise equivalent to the solenoids. Solenoid 37 will step the switch in a counter clockwise direction while the solenoid 38 will step the switch in a clockwise direction. For example, if we are to modify the bulk density of coal, the clockwise step would be for a high bulk density signal and the counter clockwise step we would assume to be for a low bulk density signal which, in turn, as will quickly appear, changes the feed rate of additive being applied to the pulverized coal to increase its bulk density. The stepping switch of the controller therefore has a basic operating portion as at 39 with a shaft 40 extending therefrom to three or more sets of switching contacts 41, 42 and 43. Each set of switch contacts has an associated arm 44, 45 and 46 each of which is coupled to a common shaft 40 for rotation in synchronism under the actuation of the stepping solenoids 37 and 38.

The switching devices 43 are shown as consisting of twenty active switch points with a central dead portion. To each of the active switch points a resistance is connected, the other side of which is commonly connected to a bus-bar 50. A source of D.C. 47 is fed with one side thereof connected to the contact arm 46 and the other side thereof connected to the input to an electro-pneumatic transducer of which two are provided and designated 55 and 56. Thus, effectively, the resistance banks are connected in a fashion so that one resistance can be selected by the contact arm 46 and placed in series with the source of D.C. and the input to the electro pneumatic transducer 55 or 56 as the case might be. By providing a number of individual resistances that can be contacted in this fashion, it will be seen that one can generate or select a particular curve at each switch contact, the curve representing a certain definite output of the modifying liquid. The electro-pneumatic transducers 55 and 56 have outputs shown as at 57, 58 which outputs feed a flow control pump 20 or 21.

The flow control pumps 20 or 21 may be turbine type pumps, each with a by-pass, a differential producer, a flow controller and a throttling valve, all complete in one package, or positive displacement pumps with variable speed transmissions. The transducers 55 and 56 establish the set point of the flow controllers for the pumps and will pace the pumps at a certain rate determined by the particular point where the contact is being made by the stepping switch. So that only one of the two pumps will be turned on at a time, a switch bank 42 may be inserted into the system which switch bank has a lead 58 leading from one set of commonly connected contact points to the pump 21 while a second lead 59 leads from a second set of commonly connected contact points to the pump 20. Thus, since the contact arm 45 is in a position oriented in the same attitude as contact arm 46, the pump 21 will be activated when contact 46 is in the corresponding sector of its points so that a signal fed to the transducer 55 will produce an output from pump 21. A third set of contact banks 41 may also be provided with the same number of contacts as the switch bank 43. In this fashion an indicator may be utilized in conjunction with the control system such as the number of lights which would indicate the position of the contact arm 46.

It might be desirable to overlap the two additives at their lowest values. To do this it is merely necessary to put the two additive functions on separate banks of the stepping switch that overlap. Both pumps will deliver when the stepping switch arms are in the overlap zone.

Thus, we have a rather complete picture of a particular bulk density control system which may be easily placed in operation by choosing the point at which one thinks he should operate. This can be done by manually turning the stepping switch to a predetermined spot or leaving it at neutral where no actuation will be had. The process can be started with the material being fed over the conveyor 11 and on through the pug mill to the sampling device. The sampling device, consisting of the gravimetric weigher 18, will then sample the weight of the material and send an appropriate signal to the switches 31 or 32. This sensed signal will be passed on at intervals through the timer 36. That is to say, the timer 36 will send the signals shown on the switches 31 or 32 at predetermined intervals such as every 30 seconds for instance, the 30 seconds generally representing the time it takes for a certain piece of coal to pass on through the system. If, for example, a low weight is sensed, then a signal will be sent on to the solenoid 37 causing a counterclockwise rotation. As a result the stepping switch arm 45 moves over into the area activating the pump 21 over lead 58 and similar rotation of switch arm 46 will send a signal to the pneumatic transducer 55 controlling the rate of discharge of pump 21. If the weight does not come up to the proper value, the cycle will be repeated after another interval of timer 36 until the proper amount of material is fed by pump 21 or alternately, if a reversal is signaled by pump 20.

It will be seen that the program controller 35 has a rather unique design in conjunction with it, since it permits the operator to "tune" the entire control system to any particular desired feed curves. The resistances shown schematically in the drawing as variable resistances may be set up to generate any particular rate of feed by the associated pump which it controls. For instance let us assume that the desired feeding rate curve is not linear. This can easily be set into the machine by adjusting the resistances on the adjacent contacts at points where non-uniform or non-linear resistances will be had at adjacent contacts or in successive contact points.

I claim:

1. Apparatus for proportioning at least a first material to the volume of a second material comprising means for maintaining a constant volume feed of a second material, means for sensing the weight per unit volume of the second material, a controller mechanism, means for sending an error signal from the sensing means to a controller mechanism at spaced time intervals, said controller correcting on a preset increment basis regardless of the magnitude of the error detected, variable feeding means for the first material connected between a supply of the first material and a discharge point ahead of said sensing means, said controller mechanism coupled to said feeding means whereby the amount of first material fed to the second material is controlled incrementally.

2. Apparatus for proportioning at least a first material to a second material comprising conveyor means carrying the second material, means for sensing the weight of the second material at a point on the conveyor means, a controller mechanism, means for sending an error signal from the sensing means to the input of a controller mechanism at spaced time internals, said signal sending means including an interval timing switch, said controller comprising a stepping switch responsive only to one signal in any interval, said switch connecting a power source selectively through one of a plurality of resistances to the variable feeding means to control the rate of feed, variable feeding means for the first material connected between a supply of the first material and a discharge point ahead of said sensing means, the output of said controller mechanism coupled to said feeding means whereby the amount of first material fed to the second material is controlled, said controller correcting incrementally regardless of the magnitude of the error sensed.

3. Apparatus as in claim 2 wherein each of the successive resistances connected to the successive contacts of the stepping switch are individually adjustable to permit the establishment of various non-linear increments.

4. Apparatus as in claim 2 wherein the sensing means includes means for securing a sample of the first and second material and discharging the sample onto a gravimetric weigher, said weigher having a low weight responsive device and a high weight responsive device, said stepping switch having a clockwise and counter-clockwise actuating coils, the outputs of said devices being coupled to clockwise and counter-clockwise actuating coils.

5. Apparatus as in claim 4 wherein said variable feeding means comprises a variable discharge pump having an electropneumatic speed control, the position of said switch affecting the parameters of the circuit to said speed control and the speed of said pumps.

References Cited in the file of this patent
UNITED STATES PATENTS

| | | |
|---|---|---|
| 2,510,158 | Von Ackeren | June 6, 1950 |
| 2,980,291 | Schuerger | Apr. 18, 1961 |